United States Patent
Cheng et al.

(10) Patent No.: US 10,670,010 B2
(45) Date of Patent: Jun. 2, 2020

(54) DIRECT NUMERIC 3D SENSORLESS CONVERTER FOR PUMP FLOW AND PRESSURE

(71) Applicant: FLUID HANDLING LLC., Morton Grove, IL (US)

(72) Inventors: Andrew A. Cheng, Wilmette, IL (US); Kyle D. Schoenheit, Waterloo, NY (US)

(73) Assignee: Fluid Handling LLC, Morton Grove, IL (US)

( * ) Notice: Subject to any disclaimer, the term of this patent is extended or adjusted under 35 U.S.C. 154(b) by 61 days.

(21) Appl. No.: 15/616,271

(22) Filed: Jun. 7, 2017

(65) Prior Publication Data

US 2017/0363078 A1  Dec. 21, 2017

Related U.S. Application Data

(60) Provisional application No. 62/346,808, filed on Jun. 7, 2016.

(51) Int. Cl.
*G05D 7/00* (2006.01)
*G05D 11/00* (2006.01)
(Continued)

(52) U.S. Cl.
CPC .......... *F04B 49/065* (2013.01); *F04B 23/04* (2013.01); *F04B 49/20* (2013.01); *F04B 49/22* (2013.01);
(Continued)

(58) Field of Classification Search
CPC .......... F04B 49/065; F04B 2203/0208; F04B 2203/0209; F04B 2205/07; F04B 2205/09;
(Continued)

(56) References Cited

U.S. PATENT DOCUMENTS 6,591,697 B2   7/2003   Henyan
6,795,780 B1   9/2004   Hyde
(Continued)

FOREIGN PATENT DOCUMENTS

CA   2931602        6/2015
CN   102539825 A    7/2012
(Continued)

OTHER PUBLICATIONS

English language translation with abstract of CN105386487.
(Continued)

*Primary Examiner* — Zhipeng Wang
(74) *Attorney, Agent, or Firm* — Ware, Fressola, Maguire & Barber LLP

(57) ABSTRACT

A pump controller features a signal processor configured to respond to signaling containing information about three corresponding discrete arrays with respect to a discrete motor speed for each system position at a motor speed derived from 3D discrete distribution surfaces of motor power, pump differential pressure and flow rate by respective numerical interpolations; and determine corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, the signaling received. The signal processor is configured to provide the corresponding signaling as control signaling to control the pump, or the pumps in the system of pumps, or the system of pumps.

17 Claims, 5 Drawing Sheets

Sensorless converter for pumping system.

(51) Int. Cl.
*F04B 49/06* (2006.01)
*F04B 23/04* (2006.01)
*F04B 49/20* (2006.01)
*F04B 49/22* (2006.01)
*G05D 7/06* (2006.01)

(52) U.S. Cl.
CPC .... *G05D 7/0682* (2013.01); *F04B 2203/0208* (2013.01); *F04B 2203/0209* (2013.01); *F04B 2205/07* (2013.01); *F04B 2205/09* (2013.01)

(58) Field of Classification Search
CPC .......... F04B 23/04; F04B 49/20; F04B 49/22; F04D 15/0066; F04D 15/0088; F05D 2270/304; F05D 2270/335; G05D 7/0676; G05D 7/0682
See application file for complete search history.

(56) References Cited

U.S. PATENT DOCUMENTS

| | | | |
|---|---|---|---|
| 7,168,924 | B2 | 1/2007 | Beck et al. |
| 7,945,411 | B2 | 5/2011 | Kernan et al. |
| 8,019,479 | B2 | 9/2011 | Stiles et al. |
| 8,240,241 | B2 | 8/2012 | Batenburg |
| 8,417,483 | B2 | 4/2013 | Anderson et al. |
| 8,425,200 | B2 | 4/2013 | Tran et al. |
| 8,672,641 | B2 | 3/2014 | Yuratich |
| 8,774,972 | B2 | 7/2014 | Rusnak et al. |
| 8,840,118 | B1 | 9/2014 | Giovanardi et al. |
| 9,145,876 | B2 | 9/2015 | Kagawa |
| 2003/0091443 | A1* | 5/2003 | Sabini ................ F04D 15/0066 417/53 |
| 2004/0064292 | A1* | 4/2004 | Beck ..................... E21B 43/126 702/182 |
| 2007/0212210 | A1* | 9/2007 | Kernan ................ F04D 27/001 415/1 |
| 2012/0251340 | A1 | 10/2012 | Ahonen et al. |
| 2014/0135999 | A1 | 5/2014 | Stavale |
| 2014/0249682 | A1* | 9/2014 | Cheng ................ F04D 15/0088 700/282 |
| 2014/0288716 | A1* | 9/2014 | Cheng ................ F04D 15/0066 700/282 |
| 2015/0032271 | A1* | 1/2015 | Cheng .................. F04B 49/065 700/282 |
| 2016/0010639 | A1 | 1/2016 | Cheng et al. |
| 2016/0084274 | A1 | 3/2016 | Afshari |
| 2016/0356276 | A1* | 12/2016 | Cheng ................ F04D 15/0088 |
| 2017/0370362 | A1* | 12/2017 | Cheng ................ F04D 15/0072 |

FOREIGN PATENT DOCUMENTS

| | | |
|---|---|---|
| CN | 103370538 A | 10/2013 |
| CN | 105386487 A | 3/2016 |
| CN | 105492813 A | 4/2016 |
| CN | 105518305 A | 4/2016 |
| DE | 102008038520 A1 | 2/2010 |
| DE | 102013214734 A1 | 1/2015 |
| JP | 2003268750 A | 9/2003 |
| KR | 101369780 B1 | 2/2014 |
| WO | 2008073386 A2 | 6/2008 |
| WO | 2008148075 A1 | 12/2008 |
| WO | 2014089694 A1 | 6/2014 |
| WO | 2015080757 A1 | 6/2015 |
| WO | 2015157276 A2 | 10/2015 |

OTHER PUBLICATIONS

English language translation with abstract of DE102008038520A1.
English language abstract of DE102013214734A1.
English language abstract of JP2003268750A.
English language abstract of KR101369780B1.
"ESP: Electric Submersible Pump Drive," UNICO, unicous.com, Jun. 12, 2016, printed on Jun. 17, 2016. http://web.archive.org/web/20160612011826/http://www.unicous.com/sites/default/files/user_files/Products/ESP/ESP%207.13.pdf.
Durfee, William, Zongxuan Sun, and James Van de Ven, "Fluid Power System Dynamics," Univ. of Minnesota's Department of Mechanical Engineering, a National Science Foundation Engineering Research Center, Sep. 25, 2015. http://www.me.umn.edu/~wkdurfee/projects/ccefp/fp-chapter/fluid-pwr.pdf.
Ward, Thomas et al., "Microfluidic flow focusing: Drop size and scaling inpressure versus flow-rate-driven pumping," Harvard University Cambridge Division of Engineering and Applied Sciences. Electrophoresis, 26 pp. 3716-3724: (2005). https://www.researchgate.net/profile/Magalie_Faivre/publication/7569199_Microfluidic_flow_focusing_drop_size_and_scaling_in_pressure_versus_flow-rate-Driven_Pumping.
"Pro Services: PumpSmart® Control Solutions," ITT, ittproservices.com, Apr. 11, 2014. http://web.archive.org/web/20140411210033/http://www.ittproservices.com/ittgp/medialibrary/ITTPROServices/website/Literature/Brochures/PRO%20Services/PSmartbulletin.pdf?ext=.pdf.
Bakman, Ilja, "Implementation and testing the sensorless pressure measurement of centrifugal pumps." 13th International Symposium Topical Problems in the Field of Electrical and Power Engineering, Doctoral School of Energy and Geotechnology II, Pärnu, Estonia. 2013, printed on Jun. 17, 2016. http://egdk.ttu.ee/files/parnu2013/Parnu_2013_132-138.pdf.
English language Abstract of CN105518305A.
English language Abstract of CN105492813A.
English language Abstract of CN103370538A.
English language Abstract of CN102539825A.
Ma, Z., "Energy Efficient Control of Variable Speed Pumps in Complex Building Central Air-Conditioning Systems," Lausanne, Ch, vol. 41, No. 2, Feb. 1, 2009, pp. 197-205.

\* cited by examiner

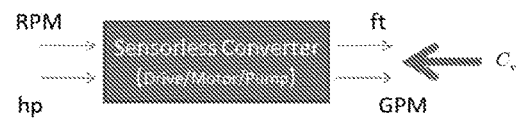
Figure 1. Sensorless converter for pumping system.
Fig. 2A                               Fig. 2B
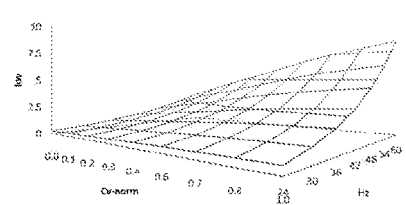 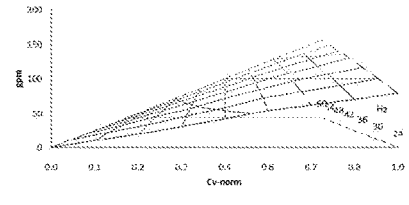
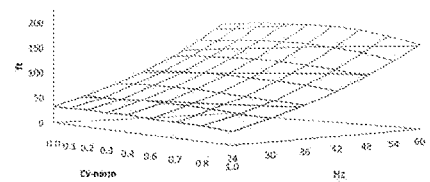
Fig. 2C
Figure 2. 3D discrete distribution functions of motor power, pump differential pressure and flow rate with respect to motor speed and normalized system characteristics, respectively.

Fig. 3A
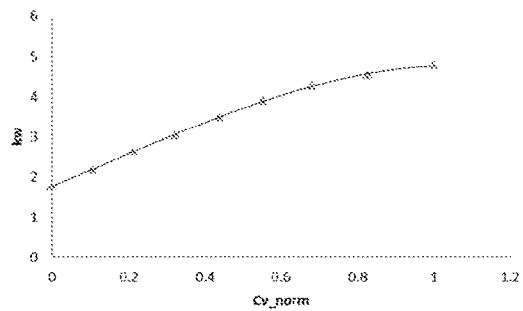
Fig. 3B
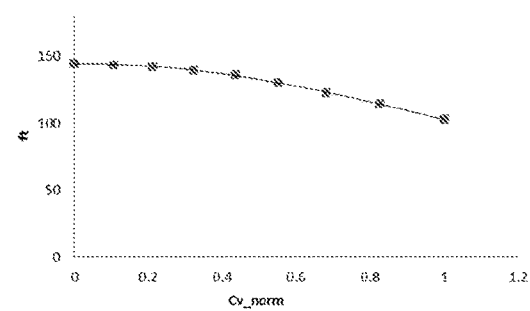
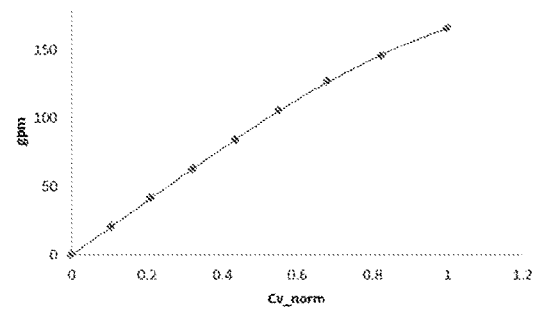
Fig. 3C
Figure 3. Motor power, pump flow rate and pressure curves of $w_j$, $q_j$ and $p_j$ with respect to the normalized system position of $C_{v\_norm}$ at a given motor speed of $n = 49.5\text{Hz}$.

Fig. 4A
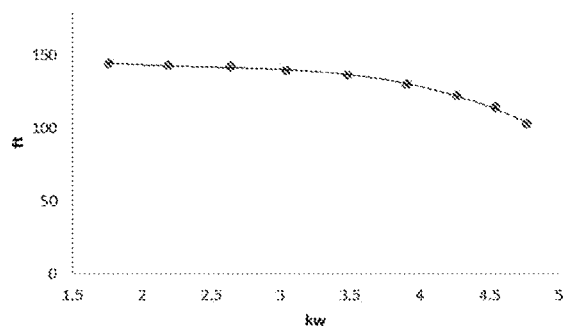
Fig. 4B
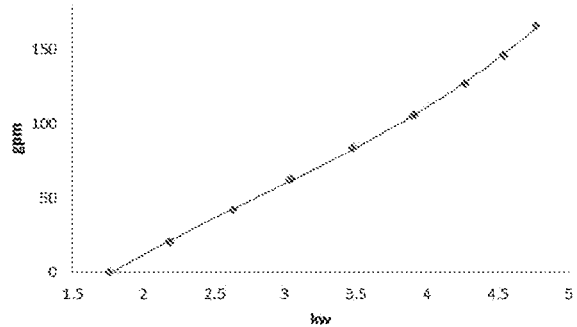
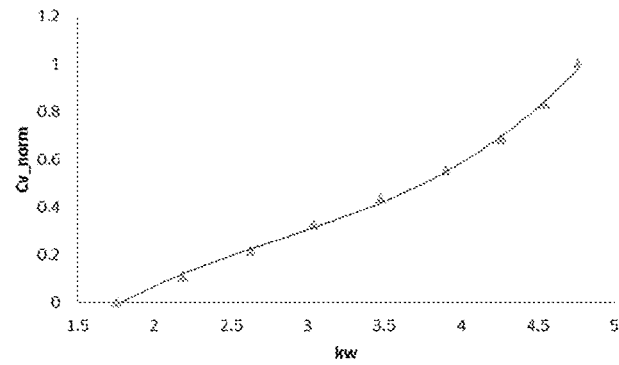
Fig. 4C
Figure 4. Flow rate, pressure, and system coefficient numerical distributions of $\bar{q}_j$, $\bar{p}_j$ and $\bar{C}_v$ with respect to motor power of $w$ at pump speed of $n = 49.5\text{Hz}$.

Fig. 5A
Fig. 5B
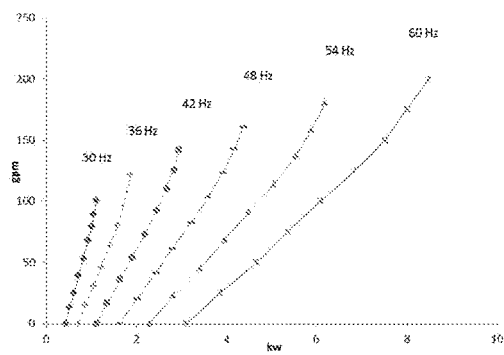
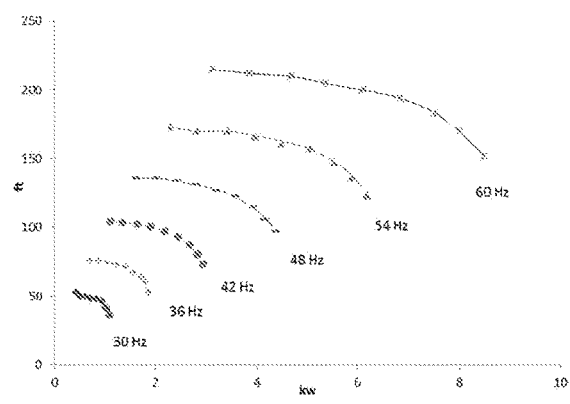
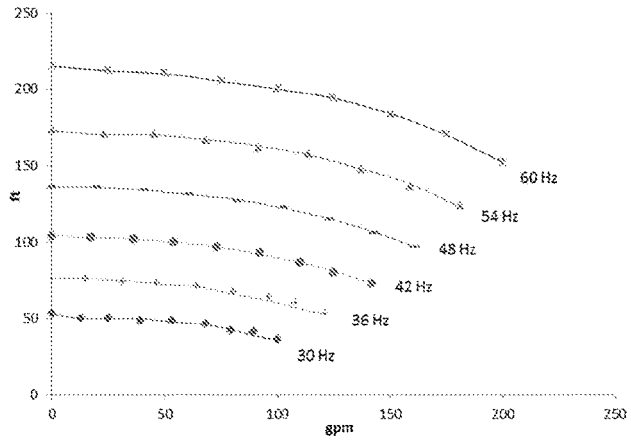
Fig. 5C
Figure 5. Comparison of pump differential pressure and system flow rate
from the sensorless converter (solid lines) and the measured data from sensors (symbols).

Apparatus 10, e.g., including a system of pumps arranged in a multiple pump configuration, A controller 10a having a signal processor or processing module configured at least to:

receive signaling containing information about three corresponding discrete arrays with respect to a discrete motor speed for each system position at a motor speed derived from 3D discrete distribution surfaces of motor power, pump differential pressure and flow rate by respective numerical interpolations;

determine corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, and the signaling received; and/or provide the corresponding signaling as control signaling to control the apparatus, e.g., including a pump, or pumps in a system of pumps, or a system of pumps.

Other signal processor circuits or components 10b that do not form part of the underlying invention, e.g., including input/output modules, one or more memory modules, data, address and control busing architecture, etc.

Figure 6

DIRECT NUMERIC 3D SENSORLESS CONVERTER FOR PUMP FLOW AND PRESSURE

CROSS REFERENCE TO RELATED APPLICATION

This application claims benefit to U.S. provisional application No. 62/346,808, filed 7 Jun. 2016, which is hereby incorporated by reference in its entirety.

BACKGROUND OF THE INVENTION

1. Field of the Invention

The present invention relates to a technique for controlling a pump; and more particularly relates to a technique for controlling a pump in a system of pumps.

2. Brief Description of Related Art

In earlier works by the one or more inventors of the present application on hydronic pumping system sensorless control and monitoring, a discrete numerical sensorless converter, based upon three (3) distribution matrices of pump pressure, flow rate and motor power with respect to motor speed and system characteristics coefficient, so-called 3D sensorless converter, was developed and disclosed in reference nos. [1-4] below. The core components of 3D sensorless converter consists of three (3) discrete distribution surface functions of pump flow rate, differential pressure, and motor power with respect to motor speed and the equivalent system characteristics coefficient measured from a pumping system respectively and the conversion procedures and algorithms to derive the corresponding values of pump pressure and flow rate from a given pair of motor speed and power. In the previous disclosed 3D sensorless converter, the conversion procedure is to derive the system coefficient from the power surface function in terms of the motor speed and system coefficient with a given pair of motor power and speed values first. The pump pressure and flow rate can then be derived from pressure and flow rate surfaces in terms of the motor speed and system coefficient with the pair of the motor speed and the system coefficient known values directly. The bilinear interpolation is used to compute those desired values. The conversion accuracy by using the sensorless model introduced using the technique disclosed is satisfactory specifically in the pump operation region above the motor speed of 36 Hz. However, at lower motor speeds, where pump sliding can happen with those surfaces curvature changing a little more, the bilinear inversion algorithm may lose a little accuracy.

The reference nos. [1-4] include the patent applications, as follows:

[1] U.S. application Ser. No. 14/091,795, filed 27 Nov. 2013, entitled "3D sensorless conversion method and apparatus," which claims benefit to U.S. provisional application No. 61/771,375, filed 1 Mar. 2013, now abandoned;

[2] U.S. application Ser. No. 14/187,817, filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013, now abandoned;

[3] U.S. application Ser. No. 14/339,594, filed 24 Jul. 2014, entitled "Sensorless Adaptive Pump Control with Self-Calibration Apparatus for Hydronic Pumping System," which claims benefit to U.S. provisional application Ser. No. 61/858,237 filed 25 Jul. 2013, now abandoned;

[4] U.S. application Ser. No. 15/173,781, filed 6 Jun. 2016, entitled "Direct numeric affinity pumps sensorless converter," which claims benefit to provisional patent application Ser. No. 62/170,997, filed 4 Jun. 2015, now abandoned;

which are all hereby incorporated by reference.

The present invention builds on this family of technologies disclosed in the aforementioned related applications identified herein.

SUMMARY OF THE INVENTION

In summary, the present invention provides a new direct numerical 3D pump sensorless conversion procedure and algorithm, e.g. using a higher order numerical interpolation and more direct numerical conversion procedure respectively, e.g., to improve the conversion accuracy in the low speed region(s) of operation of a pump(s) in a pump system. By way of example, first three (3) corresponding discrete arrays with respect to discrete motor speed for each system position at a motor speed may be derived from 3D discrete distribution surfaces of motor power, pump differential pressure and flow rate by the numerical interpolation respectively. The pump pressure and flow rate at the speed for a corresponding power reading value can then be obtained directly by numerical interpolation based upon the three (3) corresponding discrete arrays. The conversion accuracy is improved with around 5% error in the normal pump operation hydronic region.

Specific Embodiments

According to some embodiments, the present invention may include, or take the form of, a method or apparatus, e.g., in a controller for a pump or pump system, featuring a signal processor or signal processing module, configured to:
  receive signaling containing information about three corresponding discrete arrays with respect to a discrete motor speed for each system position at a motor speed derived from 3D discrete distribution surfaces of motor power, pump differential pressure and flow rate by respective numerical interpolations; and
  determine corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, and the signaling received.

According to some embodiments, the present invention may include one or more of the following features:

The signal processor or processing module may be configured to provide the corresponding signaling as control signaling to control the apparatus, e.g., which may take the form of, or include, a pump, or one or more pumps in a system of pumps, or a system of pumps.

By way of example, the signal processor or processing module may be configured to implement 3D discrete distribution functions of the motor power, the flow rate and the pump differential pressure with respect to the discrete motor speed for each system position that include, or takes the form of, the equations, as follows:

$$\overline{w}(W_{ij}, n_i, C_{vj}) = 0, \quad (1.1)$$

$$\overline{g}(Q_{ij}, n_i, C_{vj}) = 0, \text{ and} \quad (1.2)$$

$$\overline{p}(P_{ij}, n_i, C_{vj}) = 0, \quad (1.3)$$

where the functions $\overline{w}$, $\overline{q}$ and $\overline{p}$ are 2 dimensional discrete numerical distribution functions with respect to a discrete motor speed of $n_i$ and system position of $C_{vj}$, based upon matrices of 3D discrete pump data of $(P_{ij}, Q_{ij}, W_{ij})$, where $i=1, 2, \ldots N$ and $j=1, 2, \ldots, M$, respectively.

By way of further example, the signal processor may be configured to determine discrete motor power, flow rate and pump differential pressure of $w_j$, $q_j$ and $p_j$ at a given motor speed of n, e.g. by numerical interpolation with respect to the discrete motor speed of $n_i$ at each discrete system position of $C_{vj}$ with $j=1, 2, \ldots, M$, respectively, in form of the equations, as follows:

$$w_j(n) = \overline{w}_i(n_i, W_{ij}, n), \quad (2.1)$$

$$q_j(n) = \overline{q}_i(n_i, Q_{ij}, n), \text{ and} \quad (2.2)$$

$$p_j(n) = \overline{p}_i(n_i, P_{ij}, n), \quad (2.3)$$

where $\overline{w}_i$, $\overline{q}_i$ and $\overline{p}_i$ are discrete numerical distribution functions with respect to the discrete motor speed of $n_i$, based upon the matrices of 3D discrete pump data of $(P_{ij}, Q_{ij}, W_{ij})$.

By way of still further example, by using the numerical interpolation of three (3) discrete array points of $w_j$, $q_j$ and $p_j$, the corresponding pump pressure and flow rate for a motor power of w at a motor speed of n may be represented by the equations, as follows:

$$Q(n, w) = \overline{q}_j(w_j(n), q_j(n), w), \quad (3.1)$$

$$P(n, w) = \overline{p}_j(w_j(n), p_j(n), w), \quad (3.2)$$

$$C_v(w, n) = \overline{C}_v(w_j(n), C_{vj}, w), \quad (3.3)$$

where $\overline{q}_j$, $\overline{p}_j$ and $\overline{C}_v$ are the pump differential pressure, pump flow rate and system coefficient numerical distribution functions with respect to a corresponding motor power of $\overline{w}_j$ or w at the motor speed of n.

The apparatus may include, or take the form of, a controller, a pump controller or a pump system controller configured with the signal processor or processing module for controlling a pump, or one or more pumps in a system of pumps, or a system of pumps, e.g., including a system of pumps in a hydronic pumping system.

The apparatus may include, or take the form of, a pump on such a system of pumps having such a controller, including where the controller is configured with the signal processor or processing module for controlling the pump, e.g., including where the system of pumps includes, or takes the form of, a hydronic pumping system.

By way of example, the signal processor or processing module may include, or take the form of, at least one signal processor and at least one memory including computer program code, and the at least one memory and computer program code are configured to, with at least one signal processor, to cause the signal processor at least to receive the signaling and determine the corresponding signaling, and the signaling received. The signal processor or processing module may be configured with suitable computer program code in order to implement suitable signal processing algorithms and/or functionality, consistent with that set forth herein. One skilled in the art would appreciate and understand how to implement any such computer program code to perform the signal processing functionality set forth herein without undue experimentation based upon that disclosed in the instant patent application.

According to some embodiments, the present invention may also take the form of a method including steps for:
 receiving in a signal processor or processing module signaling containing information about three corresponding discrete arrays with respect to a discrete motor speed for each system position at a motor speed derived from 3D discrete distribution surfaces of motor power, pump differential pressure and flow rate by respective numerical interpolations; and
 determining in the signal processor or processing module corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, and the signaling received.

The method may also include one or more of the features set forth herein, including providing from the signal processor or processing module the corresponding signaling as control signaling to control the pump, the one or more pumps in a system of pumps, or the system of pumps, e.g., consistent with that set forth herein.

The present invention provides a new technique that is a further development of, and builds upon, the aforementioned family of technologies set forth herein.

BRIEF DESCRIPTION OF THE DRAWING

The drawing includes the following Figures, which are not necessarily drawn to scale:

FIG. 1 shows a sensorless converter for pumping system.

FIG. 2 includes FIGS. 2A thru 2C, which show 3D discrete distribution functions of motor power, pump differential pressure and flow rate with respect to motor speed (Hz) and normalized system characteristics (Cv_norm), respectively, where FIG. 2A a graph of the motor power (kw), FIG. 2B is a graph of the pressure (ft); and FIG. 2C is a graph of the pump flow rate (gpm).

FIG. 3 includes FIGS. 3A thru 3C, which show motor power, pump flow rate and pressure curves of $w_j$, $q_j$ and $p_j$ with respect to the normalized system position of $C_{v\_norm}$ at a given motor speed of n=49.5 Hz, where FIG. 3A a graph of the motor power (kw), FIG. 3B is a graph of the pressure (ft); and FIG. 3C is a graph of the pump flow rate (gpm).

FIG. 4 includes FIGS. 4A thru 4C, which show flow rate, pressure, and system coefficient numerical distributions of $\overline{q}_j$, $\overline{p}_j$ and $\overline{C}_v$ with respect to motor power of w at pump speed of n=49.5 Hz, where FIG. 4A a graph of the pressure (ft) versus motor power (kw), FIG. 4B is a graph of the flow rate (gpm) versus the motor power (kw); and FIG. 4C is a graph of the normalized system characteristics (Cv_norm) versus the motor power (kw).

FIG. 5 includes FIGS. 5A thru 5C, which show comparisons of pump differential pressure and system flow rate from the sensorless converter (solid lines) and measured data from sensors (symbols, e.g., including diamonds, plus signs (+), circles, dashes, triangles, and the letters "x") for pumps speed of 30 Hz, 36 Hz, 42 HZ, 48 HZ, 54 Hz and 60 Hz respectively, where FIG. 5A a graph of the flow rate (gpm) versus motor power (kw), FIG. 5B is a graph of the pressure (ft) versus the motor power (kw); and FIG. 5C is a graph of the pressure (ft versus the flow rate (gpm.

FIG. 6 is a block diagram of apparatus, e.g., having a controller with a signal processor or processing module configured therein, according to some embodiments of the present invention.

DETAILED DESCRIPTION OF THE INVENTION

According to the present invention, alternative 3D discrete numerical pump sensorless conversion procedures and algorithms are set forth, e.g. by using a higher order numerical interpolation and direct numerical conversion procedure respectively, to improve the conversion accuracy in the low speed region(s) of operation of a pump.

Direct Numerical Method for 3D Discrete Sensorless Conversion

Consistent with that disclosed in reference no. [1] herein for a sensorless converter schematically shown in FIG. 1, three (3) discrete distribution surfaces (3D) of motor power readings, pump differential pressure, flow rate with respect to system hydronic characteristics and motor speed may be obtained from measurement data or so-called calibrating data and are presented or shown in FIG. 2.

To resolve the pump differential pressure and flow rate at a system position based upon a pair of motor speed and power given, a direct numerical sensorless conversion approach for 3D discrete sensorless conversion is set forth herein. For example, first at a motor speed, e.g., say, at 49.5 Hz, three (3) corresponding discrete data curves or arrays at each discrete system position may be obtained from three (3) discrete distribution surfaces of power, pressure and flow rate by numerical interpolation with respect to the discrete motor speed respectively. Three (3) arrays of the data obtained may then be rearranged into the pressure and flow with respect to power and formulated in the form of their corresponding interpolation functions. Therefore, the pump pressure and flow rate for a given power value at the speed, for instance, 49.5 Hz, can then be obtained directly by numerical interpolation.

The numerical formulation by the sensorless conversion procedures introduced herein may be represented mathematically by referencing the direct numerical approach in reference no. [4] herein as follows. First, the 3D discrete distribution functions of motor power, pump flow rate as well as differential pressure with respect to motor speed and system position may be represented as follows:

$$\bar{w}(W_{ij}, n_i, C_{vj}) = 0, \tag{1.1}$$

$$\bar{g}(Q_{ij}, n_i, C_{vj}) = 0, \text{ and} \tag{1.2}$$

$$\bar{p}(P_{ij}, n_i, C_{vj}) = 0, \tag{1.3}$$

where $\bar{w}$, $\bar{q}$ and $\bar{p}$ are 2 dimensional discrete numerical distribution functions with respect to a pump speed of n, and a system position of $C_{vj}$, based upon the matrices of 3D discrete pump data of ($P_{ij}$, $Q_{ij}$, $W_{ij}$), where i=1, 2, ... N and j=1, 2, ... , M, respectively.

The discrete motor power, pump flow rate and differential pressure of $w_j$, $q_j$ and $p_j$ at a given motor speed of n may be obtained by numerical interpolation with respect to motor speed of at each the discrete system position of $C_{vj}$ with j=1, 2, ... , M, respectively, in form of the following:

$$w_j(n) = \bar{w}_i(n_i, W_{ij}, n), \tag{2.1}$$

$$q_j(n) = \bar{q}_i(n_i, Q_{ij}, n), \text{ and} \tag{2.2}$$

$$p_j(n) = \bar{p}_i(n_i, P_{ij}, n), \tag{2.3}$$

where $\bar{w}_i$, $\bar{q}_i$ and $\bar{p}_i$ are the discrete numerical distribution functions with respect to motor speed of $n_i$, based upon the matrices of 3D discrete pump data of ($P_{ij}$, $Q_{ij}$, $W_{ij}$), shown in FIG. 3, respectively.

By the numerical interpolation of the 3 discrete array points of $w_j$, $q_j$ and $p_j$, the pump pressure and flow rate for the motor power of w at the speed of n may be represented as follows:

$$Q(n,w) = \bar{q}_j(w_j(n), q_j(n), w), \tag{3.1}$$

$$P(n,w) = \bar{p}_j(w_j(n), p_j(n), w), \tag{3.2}$$

$$C_v(w,n) = \bar{C}_v(w_j(n), C_{vj}, w), \tag{3.3}$$

where $\bar{q}_j$, $\bar{p}_j$ and $\bar{C}_v$ are the pump differential pressure, pump flow rate and the system coefficient numerical distribution functions with respect to the motor power of $\bar{w}_j$ or w at motor speed of n, shown in FIG. 4, respectively.

The distribution functions of $\bar{q}$, $\bar{p}$ and $\bar{C}_v$ may be formulated through any numerical means or technique, for instance, by using interpolation or curve fitting. However, for a slightly or little more complicated distributions, the piecewise numerical interpolation may be recommended to achieve better functional representation and desired accuracy. Note that the monotonic distribution on power with respect to flow is required.

By using the direct numerical 3D sensorless conversion algorithms defined in Eq. 3, the pump differential pressure and flow rate values may be computed for a pumping system and compared with the measured data, which are shown in FIG. 5, respectively. The conversion accuracy is satisfactory with less than 5% error within the pump normal operation hydronic region.

The direct numerical pump sensorless converter disclosed herein is formulated and resolved numerically from pump, power characteristics data measured directly with the satisfactory accuracy for most pumping control applications and monitoring applications. The technique may be applied to any form of pump characteristics distribution pump simple or complicated, as long as the monotonic power distribution with respect to flow is preserved.

FIG. 6: Implementation of Signal Processing Functionality

By way of further example, FIG. 6 shows apparatus 10 according to some embodiments of the present invention for implementing the associated signal processing functionality disclosed herein. The apparatus features a controller 10a having a signal processor or processing module configured at least to:

receive signaling containing information about three corresponding discrete arrays with respect to a discrete motor speed for each system position at a motor speed derived from 3D discrete distribution surfaces of motor power, pump differential pressure and flow rate by respective numerical interpolations; and determine corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, and the signaling received.

In operation, the signal processor or processing module may be configured to provide corresponding signaling as control signaling to control the pump, or the system of pumps, e.g., such as a system of pumps in a hydronic pumping system. By way of example, the corresponding signaling may also be used to control the pumping hydronic system.

The signal processor or processing module may be configured in, or form part of, e.g., such a controller, such a system having pumps with such a controller, and/or a hydronic pump system having pumps with such a controller, e.g., which may include or be implemented in conjunction with one or more other controllers configured therein. By way of example, embodiments are envisioned in which the apparatus is, or takes the form of, a pump, or one or more pumps in a system of pumps, or the system of pumps.

By way of example, the functionality of the apparatus 10 may be implemented using hardware, software, firmware, or a combination thereof. In a typical software implementation, the apparatus 10 would include one or more microprocessor-based architectures having, e. g., at least one signal processor or microprocessor like element. One skilled in the art would be able to program with suitable program code such a microcontroller-based, or microprocessor-based, implementation to perform the functionality described herein without undue experimentation. For example, the signal processor or processing module may be configured, e.g., by one skilled in the art without undue experimentation, to receive the signaling containing information about three corresponding discrete arrays with respect to a discrete motor speed for each system position at a motor speed derived from 3D discrete distribution surfaces of motor power, pump differential pressure and flow rate by respective numerical interpolations, consistent with that disclosed herein.

Moreover, the signal processor or processing module may be configured, e.g., by one skilled in the art without undue experimentation, to determine the corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, and the signaling received, consistent with that disclosed herein.

The scope of the invention is not intended to be limited to any particular implementation using technology either now known or later developed in the future. The scope of the invention is intended to include implementing the functionality of the processors as stand-alone processor, signal processor, or signal processor module, as well as separate processor or processor modules, as well as some combination thereof.

The apparatus 10 may also include, e.g., other signal processor circuits or components 10b, including random access memory or memory module (RAM) and/or read only memory (ROM), input/output devices and control, and data and address buses connecting the same, and/or at least one input processor and at least one output processor, e.g., which would be appreciate by one skilled in the art.

Various Points of Novelty

The present invention may also include, or take the form of, one or more of the following embodiments/implementations:

According to some embodiments, the present invention may include, or take the form of, implementations where a direct numerical 3D sensorless converter technique for pumping system control and monitoring may include a pumping sensorless converter which yields the pump differential pressure and flow rate associated with a dynamic system with respect to motor speed and power readings based on the pump and motor calibration data of 3 discrete distribution surfaces of motor power, pump differential pressure and flow rate. The core components of the direct numerical 3D sensorless converter may include 3 discrete distribution surface functions of pump flow rate, differential pressure, and motor power with respect to motor speed and the equivalent system characteristics coefficient measured from a pumping system respectively and the conversion procedures and algorithms to derive the corresponding values of pump pressure and flow rate from a given pair of motor speed and power, e.g., consistent with that set forth herein. With the direct numerical 3D sensorless conversion approach disclosed herein, the direct numerical conversion procedures and the corresponding numerical interpolation are provided respectively, to improve the conversion accuracy in the low speed region(s) of operation. The technique may be applied to any form of pump characteristics distributions, as long as the monotonic power distribution with respect to flow is preserved.

According to some embodiments, the present invention may include, or take the form of, implementations where the direct numerical 3D sensorless converter technique disclosed herein may also include the direct numeric distribution functions of pump differential pressure, flow rate, motor power and system coefficient which are presented in Eqs. 2-3 and also represented in FIGS. 3 and 4, which are decoupled and remapped from the conversion model between the pump pressure and flow rate, motor electrical power and speed for a pumping hydronic system as represented in FIG. 2 or Eq. 1. Following the direct numerical conversion procedures disclosed herein, there is no need to have the system characteristics coefficient to be inversed first from the power distribution function prior to obtaining pump pressure and flow rate, and the higher order numerical interpolation may be used as well, so that the pumping sensorless conversion accuracy in the low speed region(s) of operation may be improved accordingly.

According to some embodiments, the present invention may include, or take the form of, implementations where the direct numeric procedures in the direct numeric 3D sensorless converter technique disclosed herein may include:

1) three (3) corresponding discrete arrays with respect to discrete motor speed for each system position at a motor speed represented in Eq. 2 and FIG. 3 may be derived from 3D discrete distribution surfaces of motor power, pump differential pressure and flow rate by the numerical interpolation respectively, and 2) the corresponding pump pressure and flow rate at the speed for a power reading value given represented in Eq. 3 and FIG. 4 can then be obtained directly by numerical interpolation based upon the three corresponding discrete arrays.

According to some embodiments, the present invention may include, or take the form of, implementations where the numeric methods in the direct numeric 3D sensorless converter technique disclosed herein may include any kinds of numerical interpolation and fitting algorithms to obtain the corresponding pump differential pressure and flow rate. However, for little or slightly less complicated distributions, the piecewise numeric interpolation may be recommended to achieve better functional representation and accuracy.

According to some embodiments, the present invention may include, or take the form of, implementations where the system characteristics coefficient numeric conversion in the direct numeric 3D sensorless converter technique disclosed herein may include the system characteristics coefficient numeric function in form of $C_v(w, n) = \overline{C}_v(w_j(n), C_{vj}, w)$ in Eq. 3.3, which is the system coefficient distribution with respect to the motor power. For a given motor power reading value, the instant system coefficient may be obtained by Eq. 3.3 directly and numerically by interpolation or fitting algorithms.

According to some embodiments, the present invention may include, or take the form of, implementations where the motor power data in the direct numeric 3D sensorless converter technique disclosed herein above may include the motor power data measured by pump manufacturers or application customers as well. Here, the motor power data may also be replaced by any potential motor electrical or mechanical readout signals, such as motor current or torque, and so forth.

According to some embodiments, the present invention may include, or take the form of, implementations where the pumping hydronic system the direct numeric 3D sensorless converter technique disclosed herein may include, or be used in conjunction with, close loop or open loop hydronic pumping systems, such as primary pumping systems, secondary pumping systems, water circulating systems, and pressure booster systems. The systems disclosed herein here may also consist of a single zone or multiple zones as well.

According to some embodiments, the present invention may include, or take the form of, implementations where the hydronic signals the direct numeric 3D sensorless converter technique mentioned above may include pump differential pressure, system pressure or zone pressure, system or zone flow rate, and so forth.

According to some embodiments, the present invention may include, or take the form of, implementations where control signals or signaling transmitting and wiring technologies may include all conventional sensing and transmitting means or techniques that are used currently. Preferably, wireless sensor signal transmission technologies would be optimal and favorable.

According to some embodiments, the present invention may include, or take the form of, implementations where the pumps disclosed herein for the hydronic pumping systems may include a single pump, a circulator, a group or system of parallel ganged pumps or circulators, a group or system of serial ganged pumps or circulators, or their combinations.

According to some embodiments, the present invention may include, or take the form of, implementations where a systems flow regulation may include manual or automatic control valves, manual or automatic control circulators, or their combinations.

Computer Program Product

The present invention may also, e. g., take the form of a computer program product having a computer readable medium with a computer executable code embedded therein for implementing the method, e.g., when run on a signal processing device that forms part of such a pump or valve controller. By way of example, the computer program product may, e. g., take the form of a CD, a floppy disk, a memory stick, a memory card, as well as other types or kind of memory devices that may store such a computer executable code on such a computer readable medium either now known or later developed in the future.

Interpolation and Fitting Algorithms

By way of example, interpolation algorithms are understood to be techniques for providing an estimation of a value within (or between) two known values in a sequence of values. In comparison, fitting or curve fitting algorithms are understood to be techniques for constructing a curve, or mathematical function, that has a so-called best fit to a series of data points, possibly subject to restraints.

Interpolation and fitting algorithms are known in the art, and the scope of the invention is not intended to include, or be limited to any particular type or kind thereof, e.g. either now known or later developed in the future. By way of example, one skilled in the art after reading the instant patent application would understand and appreciate how to select a suitable interpolation or fitting algorithm without undue experimentation in order to implement the present invention.

The Control Signaling

In operation, the apparatus or controller may use or further process the corresponding pump pressure and flow rate determined in order to provide the corresponding signal as control signaling, when and if needed, to control the apparatus, e.g., which may take the form of, or include, a pump, or one or more pumps in a system of pumps, or a system of pumps. By way of example, the control signaling may include, or take the form of, providing suitable signaling to control the set point SP of one or more pumps, to control the speed of one or more pumps, to control valves or regulators in the pump system, etc. The scope of the invention is not intended to be limited to type or kind of control implemented in relation to the pump, or the one or more pumps in the system of pumps, or the system of pumps.

Other Related Applications

The application is related to other patent applications that form part of the overall family of technologies developed by one or more of the inventors herein, and disclosed in the following applications:

U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014; and U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011, now abandoned;

U.S. application Ser. No. 14/680,667, filed 7 Apr. 2015, entitled "A Best-fit affinity sensorless conversion means for pump differential pressure and flow monitoring," which claims benefit to provisional patent application Ser. No. 61/976,749, filed 8 Apr. 2014, now abandoned;

U.S. application Ser. No. 14/730,871, filed 4 Jun. 2015, entitled "System and flow adaptive sensorless pumping control apparatus energy saving pumping applications," which claims benefit to provisional patent application Ser. No. 62/007,474, filed 4 Jun. 2014, now abandoned; and U.S. application Ser. No. 14/969,723, filed 15 Dec. 2015, entitled "Discrete valves flow rate converter," which claims benefit to U.S. provisional application No. 62/091,965, filed 15 Dec. 2014;

U.S. application Ser. No. 15/044,670, filed 16 Feb. 2016, entitled "Detection means for sensorless pumping control applications," which claims benefit to U.S. provisional application No. 62/116,031, filed 13 Feb. 2015, entitled "No flow detection means for sensorless pumping control applications;"

which are all assigned to the assignee of the instant patent application, and which are all incorporated by reference in their entirety herein.

Data Published Pump Manufacturer

One skilled in the art would appreciate and understand that pump manufacturers publish data related to pumps that are designed, manufactured and sold by the manufacturer. The published data may include various information about the pump, e.g., including information about pump differential pressure, flow rate and corresponding power data at motor maximum speed, e.g., based upon in-house manufacturer pump testing during the pump's design. Such published information by the manufacturer may be used by a pump purchaser, or a pump design engineer, etc., in relation implementing the pump in any particular pump application, controlling the pump in any particular pump application, etc. The published pump data may be published in bound technical manuals, available on the Internet online, available on CDROMs, etc., e.g., and may include installation instructions, maintenance information, charts, graphs, accompanying illustrations/diagrams, etc.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. A pumping system, comprising:
a pump controller having a signal processor or processing module configured to:
respond to signaling received containing information about three corresponding discrete arrays with respect to a discrete motor speed for each system position at a motor speed derived from 3D discrete distribution surfaces of motor power, pump differential pressure and flow rate by respective numerical interpolations;
determine corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, and the signaling received; and
provide the corresponding signaling as control signaling to control the pump, or the pumps in a system of pumps, or the system of pumps.

2. A pumping system according to claim 1, wherein the signal processor or processing module is configured to implement 3D discrete distribution functions of the motor power, the flow rate and the pump differential pressure with respect to the discrete motor speed for each system position that include, or takes the form of, the equations, as follows:

$$\overline{w}(W_{ij}, n_i, C_{vj}) = 0, \quad (1.1)$$

$$\overline{g}(Q_{ij}, n_i, C_{vj}) = 0, \text{ and} \quad (1.2)$$

$$\overline{p}(P_{ij}, n_i, C_{vj}) = 0, \quad (1.3)$$

where the functions $\overline{w}$, $\overline{q}$ and $\overline{p}$ are 2 dimensional discrete numerical distribution functions with respect to a discrete motor speed of $n_i$ and system position of $C_{vj}$, based upon matrices of 3D discrete pump data of $(P_{ij}, Q_{ij}, W_{ij})$, where i=1, 2, ... N and j=1, 2, ..., M, respectively.

3. A pumping system according to claim 2, wherein the signal processor is configured to determine discrete motor power, flow rate and pump differential pressure of $w_j$, $q_j$ and $p_j$ at a given motor speed of n by numerical interpolation with respect to the discrete motor speed of $n_i$ at each discrete system position of $C_{vj}$ with j=1, 2, ..., M, respectively, in form of the equations, as follows:

$$w_j(n) = \overline{w}_i(n_i, W_{ij}, n), \quad (2.1)$$

$$q_j(n) = \overline{q}_i(n_i, Q_{ij}, n), \text{ and} \quad (2.2)$$

$$p_j(n) = \overline{p}_i(n_i, P_{ij}, n), \quad (2.3)$$

where $\overline{w}_i$, $\overline{q}_i$ and $\overline{p}_i$ are discrete numerical distribution functions with respect to the discrete motor speed of $n_i$ based upon the matrices of 3D discrete pump data of $(P_{ij}, Q_{ij}, W_{ij})$.

4. A pumping system according to claim 1, wherein, by the numerical interpolation of 3 discrete array points of $w_j$, $q_j$ and $p_j$, pump pressure and flow rate for a motor power of w at a motor speed of n is represented by the equations, as follows:

$$Q(n, w) = \overline{q}_j(w_j(n), q_j(n), w), \quad (3.1)$$

$$P(n, w) = \overline{p}_j(w_j(n), p_j(n), w), \quad (3.2)$$

$$C_v(w, n) = \overline{C}_v(w_j(n), C_{vj}, w), \quad (3.3)$$

where $\overline{q}_j$, $\overline{p}_j$ and $\overline{C}_v$ are the pump differential pressure, pump flow rate and system coefficient numerical distribution functions with respect to a corresponding motor power of $\overline{w}_j$ or w at the motor speed of n.

5. A pumping system according to claim 1, wherein the pumping system comprises at least one memory including computer program code;
the at least one memory and computer program code configured to, with the signal processor or processing module, cause the signal processor or processing module at least to receive the signaling and determine the corresponding signaling.

6. A method comprising:
receiving in a pump controller having a signal processor or processing module signaling containing information about three corresponding discrete arrays with respect to a discrete motor speed for each system position at a motor speed derived from 3D discrete distribution surfaces of motor power, pump differential pressure and flow rate by respective numerical interpolations;

determining in the signal processor or processing module corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, and the signaling received; and providing with the signal processor or processing module the corresponding signaling as control signaling to control the pump, or the pumps in a system of pumps, or the system of pumps.

7. A method according to claim 6, wherein the method comprises implementing with the signal processor or processing module 3D discrete distribution functions of the motor power, the flow rate and the pump differential pressure with respect to the discrete motor speed for each system position that include, or takes the form of, the equations, as follows:

$$\overline{w}(W_{ij}, n_i, C_{vj}) = 0, \quad (1.1)$$

$$\overline{q}(Q_{ij}, n_i, C_{vj}) = 0, \text{ and} \quad (1.2)$$

$$\overline{p}(P_{ij}, n_i, C_{vj}) = 0, \quad (1.3)$$

where the functions $\overline{w}$, $\overline{q}$ and $\overline{p}$ are 2 dimensional discrete numerical distribution functions with respect to a discrete motor speed of $n_i$ and system position of $C_{vj}$, based upon matrices of 3D discrete pump data of $(P_{ij}, Q_{ij}, W_{ij})$, where i=1, 2, ... N and j=1, 2, ..., M, respectively.

8. A method according to claim 7, wherein the method comprises determining with the signal processor or processing module discrete motor power, flow rate and pump differential pressure of $w_j$, $q_j$ and $p_j$ at a given motor speed of n by numerical interpolation with respect to the discrete motor speed of $n_i$ at each discrete system position of $C_{vj}$ with j=1, 2, ..., M, respectively, in form of the equations, as follows:

$$w_j(n) = \overline{w}_i(n_i, W_{ij}, n), \quad (2.1)$$

$$q_j(n) = \overline{q}_i(n_i, Q_{ij}, n), \text{ and} \quad (2.2)$$

$$p_j(n) = \overline{p}_i(n_i, P_{ij}, n), \quad (2.3)$$

where $\overline{w}_i$, $\overline{q}_i$ and $\overline{p}_i$ are discrete numerical distribution functions with respect to the discrete motor speed of $n_i$, based upon the matrices of 3D discrete pump data of $(P_{ij}, Q_{ij}, W_{ij})$.

9. A method according to claim 8, wherein the method comprises representing with the signal processor or processing module, by the numerical interpolation of 3 discrete array points of $w_j$, $q_j$ and $p_j$, pump pressure and flow rate for a motor power of w at a motor speed of n, the equations, as follows:

$$Q(n, w) = \overline{q}_j(w_j(n), q_j(n), w), \quad (3.1)$$

$$P(n, w) = \overline{p}_j(w_j(n), p_j(n), w), \quad (3.2)$$

$$C_v(w, n) = \overline{C}_v(w_j(n), C_{vj}, w), \quad (3.3)$$

where $\overline{q}_j$, $\overline{p}_j$ and $\overline{C}_v$ are the pump differential pressure, pump flow rate and system coefficient numerical distribution functions with respect to a corresponding motor power of $\overline{w}_j$ or w at the motor speed of n.

10. A method according to claim 6, wherein the method comprises configuring the signal processor or processing module with at least one memory including computer program code; and configuring the at least one memory and computer program code to, with the signal processor or processing module, cause the signal processor or processing module at least to receive the signaling and determine the corresponding signaling.

11. A pumping system comprising:

means for receiving in a signal processor or processing module signaling containing information about three corresponding discrete arrays with respect to a discrete motor speed for each system position at a motor speed derived from 3D discrete distribution surfaces of motor power, pump differential pressure and flow rate by respective numerical interpolations;

means for determining with the signal processor or processing module corresponding signaling containing information to control a pump, or pumps in a system of pumps, or a system of pumps based upon a corresponding pump differential pressure and flow rate at the motor speed for a corresponding power reading value determined using a numerical interpolation of the three corresponding discrete arrays, and the signaling received; and means for providing the corresponding signaling as control signaling to control the pump, or the pumps in a system of pumps, or the system of pumps.

12. A pumping system according to claim 1, wherein the pumping system comprises a pump or pumps in a system of pumps.

13. A pumping system according to claim 12, wherein the pumping system comprises a motor configured to receive the corresponding signaling and drive the pump or the pumps in the system of pumps.

14. A pumping system according to claim 1, wherein the pump controller is, or forms part of, a sensorless converter.

15. A pumping system according to claim 14, wherein the sensorless converter is configured to receive associated signaling containing information about rotations per minute (RPM) and horsepower (HP) of an associated pump, and provide sensorless converter signaling containing information about a pressure and gallons per minute (GPM) of the associated pump.

16. A pumping system, comprising:

a pump configured to pump fluid;

a motor configured to receive control signaling containing information to control a pump and drive the pumps; and a pump controller having a signal processor or processing module configured to:

respond to signaling received containing information about three corresponding discrete arrays with respect to a discrete motor speed for each system position at a motor speed derived from 3D discrete distribution surfaces of motor power, pump differential pressure and flow rate by respective numerical interpolations, determine the control signaling based upon a corresponding pump differential pressure and flow rate at the motor speed for a corresponding power reading value determined using a numerical interpolation of the three corresponding discrete arrays, and the signaling received, and provide the control signaling.

17. A pumping system according to claim 15, wherein the signal processor or processing module is configured to implement 3D discrete distribution functions of the motor power, the flow rate and the pump differential pressure with respect to the discrete motor speed for each system position that include, or takes the form of, the equations, as follows:

$$\bar{w}(W_{ij}, n_i, C_{vj}) = 0, \quad (1.1)$$

$$\bar{g}(Q_{ij}, n_i, C_{vj}) = 0, \text{ and} \quad (1.2)$$

$$\bar{p}(P_{ij}, n_i, C_{vj}) = 0, \quad (1.3)$$

where the functions $\bar{w}$, $\bar{q}$ and $\bar{p}$ are 2 dimensional discrete numerical distribution functions with respect to a discrete motor speed of $n_i$ and system position of $C_{vj}$, based upon matrices of 3D discrete pump data of $(P_{ij}, Q_{ij}, W_{ij})$, where $i=1, 2, \ldots N$ and $j=1, 2, \ldots, M$, respectively, and determine discrete motor power, flow rate and pump differential pressure of $w_j$, $q_j$ and $p_j$ at a given motor speed of n by numerical interpolation with respect to the discrete motor speed of $n_i$ at each discrete system position of $C_{vj}$ with $j=1, 2, \ldots, M$, respectively, in form of the equations, as follows:

$$w_j(n) = \bar{w}_i(n_i, W_{ij}, n), \quad (2.1)$$

$$q_j(n) = \bar{q}_i(n_i, Q_{ij}, n), \text{ and} \quad (2.2)$$

$$p_j(n) = \bar{p}_i(n_i, P_{ij}, n), \quad (2.3)$$

where $\bar{w}_i$, $\bar{q}_i$ and $\bar{p}_i$ are discrete numerical distribution functions with respect to the discrete motor speed of $n_i$, based upon the matrices of 3D discrete pump data of $(P_{ij}, Q_{ij}, W_{ij})$.

* * * * *